Sept. 12, 1967
E. D. BUNYEA
3,341,388
METHOD AND APPARATUS FOR THE UNIFORM
EXTRUDING OF THERMOPLASTIC FILM
Filed May 20, 1964
3 Sheets-Sheet 3
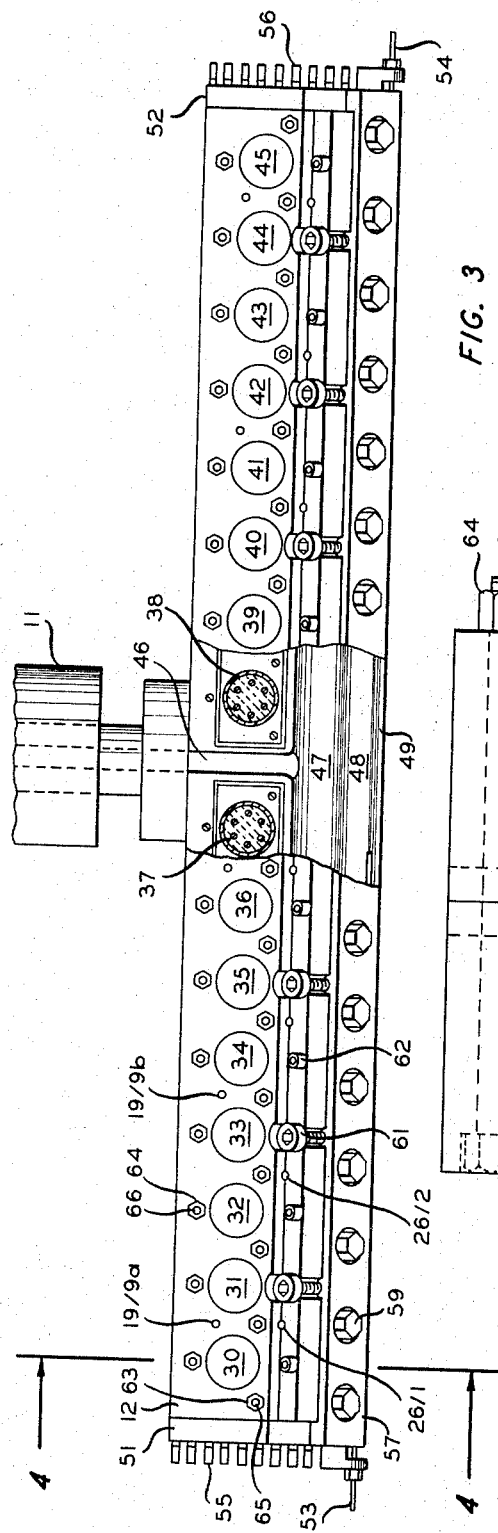
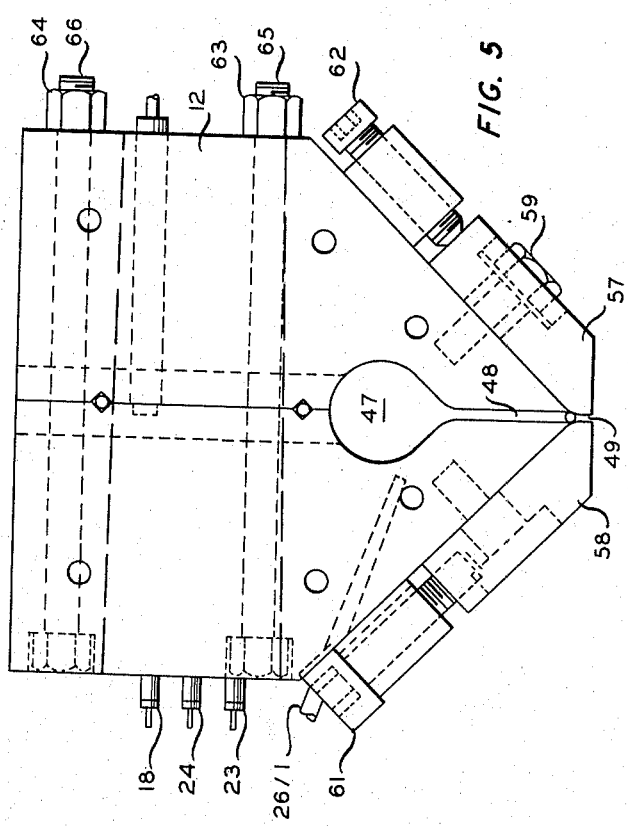
INVENTOR.
E. D. BUNYEA
BY Young and Quigg
ATTORNEYS

United States Patent Office 3,341,388
Patented Sept. 12, 1967

3,341,388
METHOD AND APPARATUS FOR THE UNIFORM EXTRUDING OF THERMOPLASTIC FILM
Edwin D. Bunyea, Chicago, Ill., assignor to Phillips Petroleum Company, a corporation of Delaware
Filed May 20, 1964, Ser. No. 368,781
7 Claims. (Cl. 156—244)

This invention relates to a method and means for extruding thermoplastic film. In one aspect this invention relates to the extrusion of thermoplastic film in the form of sheets of uniform thickness. In another aspect this invention relates to extrusion of thermoplastic film for coating web materials such as paper with a film of thermoplastic material.

In the extrusion of thermoplastic film in sheet form it is usual to extrude molten thermoplastic through a die slot having a width approximately that of the desired sheet. The thickness of the sheet of film is controlled by varying the speed at which the sheet is withdrawn from the extruder and wound onto the make-up rolls or by varying the spacing of the adjustable die jaws which form the die slot of the extruder. This method of extruding thermoplastic sheets is applicable to the process of coating web materials to produce plastic-coated paper, plastic-coated cloth and other sheeting materials capable of bonding with the thermoplastic to form a laminate of the thermoplastic and the web material.

It is desirable that the thickness of the plastic film applied to the web be uniform for the entire width of the web. It is further necessary that the die jaws which are positioned on each side of the die slot be maintained parallel to each other so as to produce a uniform die opening throughout the width of the die slot. The die jaws are advantageously adjustable along their longitudinal dimensions so that uneven expansion as a result of the temperatures employed can be corrected.

I have found that even proper adjustment of the position of the die jaws cannot always be relied upon to produce a thermoplastic film of uniform thickness across the width of the extruded sheet. I have further found that a thermoplastic film of uniform thickness across the width of the sheet can be produced by providing the proper amount of heat throughout the width of the die slot. Thus I have found that by setting the die slot at approximately the desired spacing throughout the width of the die slot, the film thickness can be controlled by controlling the amount of heat added to each of a plurality of contiguous zones spaced along the width of the die body. I have also found that temperature control of the die body is improved by removing heat from the ends of the die body. A constant amount of heat, substantially equivalent to the inherent radiation heat losses of the die body, is added throughout the die body parallel to the width of the die slot and additional quantities of heat are added to each of a plurality of zones contiguously positioned along the die body.

It is an object of this invention to provide a method and means for extruding a thermoplastic sheet of substantially uniform thickness across its entire width. Another object of this invention is to provide a method and means for controlling the temperature of thermoplastic material in the die body of an extrusion device in accordance with the thickness of the extruded sheet. A further object of the invention is to provide a method and means for controlling the heat added to each of a plurality of contiguous zones of a die body operatively connected to an extrusion device in accordance with the thickness of the sheet extruded from those zones of the die body. Other and further objects and advantages of the invention will be apparent to those skilled in the art upon reading this disclosure including the detailed description of the invention and the drawing wherein:

FIGURE 3 is an elevation, partly in section, of a die body according to a preferred embodiment of the invention;

FIGURE 4 is a section along line 4—4 of FIGURE 3; and

FIGURE 5 is an elevation of one end of the die body of FIGURE 3 with the end plate removed.

Figure 1:
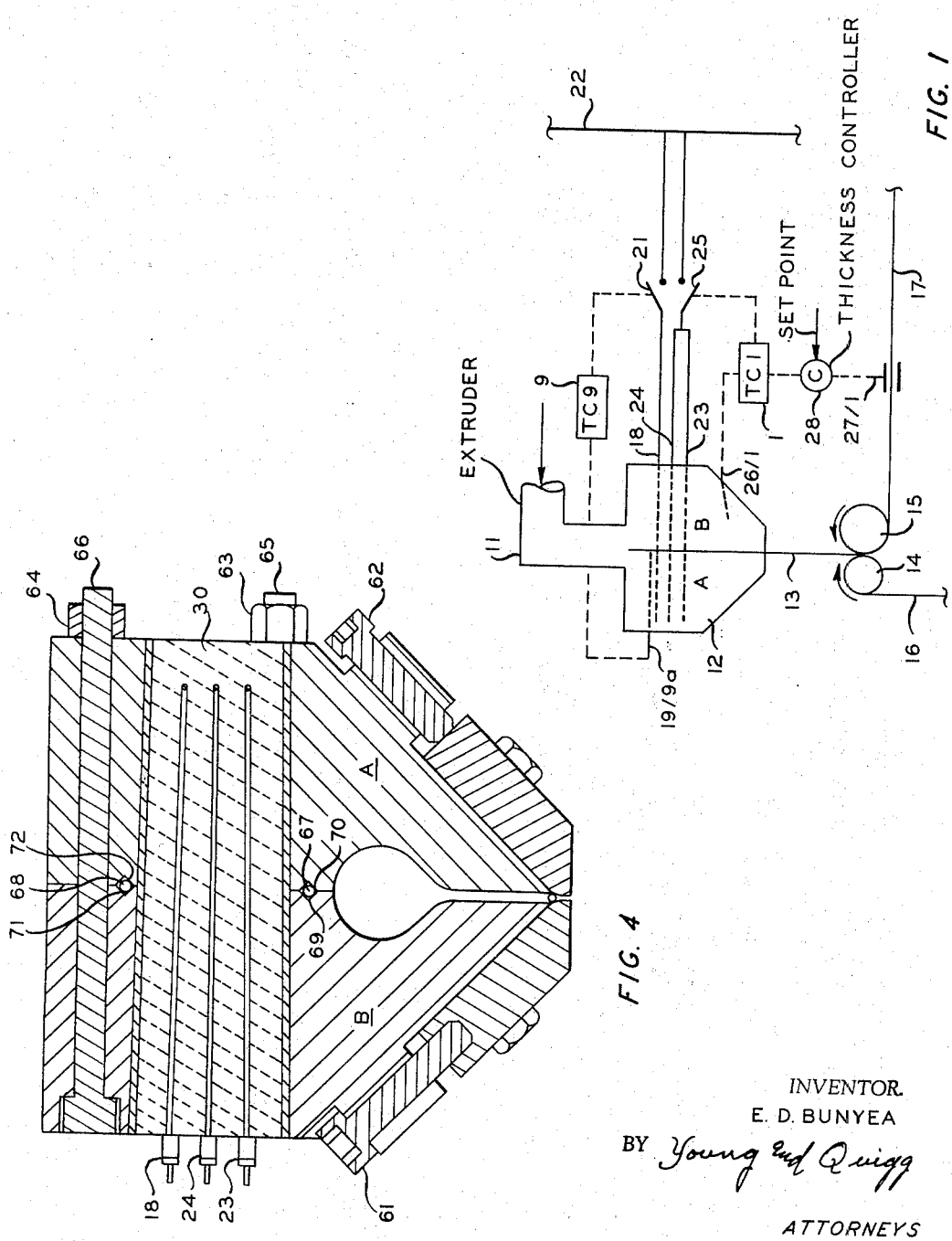
FIGURE 1 is a schematic flow diagram of an extrusion operation according to the invention.

Referring now to the drawing, a system according to the invention is schematically illustrated in FIGURE 1 wherein molten plastic is received from extruder 11 into die body 12 composed of halves A and B. The molten plastic is extruded as a sheet of film 13 which is drawn between rolls 14 and 15 onto a sheet of paper 16 received from a source not shown. The resulting sheet of plastic-coated paper 17 is removed from roll 15 to a storage facility (not shown). Roll 15 is chilled to set or freeze the plastic.

A plurality of heaters 18 is positioned in the upper portion of the die 12 as hereinafter more completely illustrated and described. A plurality of temperature-sensing elements 19/9a, also described later, is connected to temperature controller 9. Temperature controller 9 is also operatively connected to switch 21 so as to supply current to heater 18 via electric power line 22. A plurality of heaters indicated at 23 and 24 is positioned in die 12 as hereinafter more fully described and illustrated and is connected in parallel via switch 25 to electric power line 22. A plurality of temperature-sensing elements indicated at 26/1 and hereinafter described in detail is connected to temperature controller 1. A thickness gauge 27/1 measures the thickness of the plastic coating on the plastic-coated paper 17 and operates thickness controller 28 to reset temperature controller 1 to pass electrical current, or stop passage of electrical current, to heaters 23 and 24 as indicated by the set point of thickness controller 28.

Figure 2:
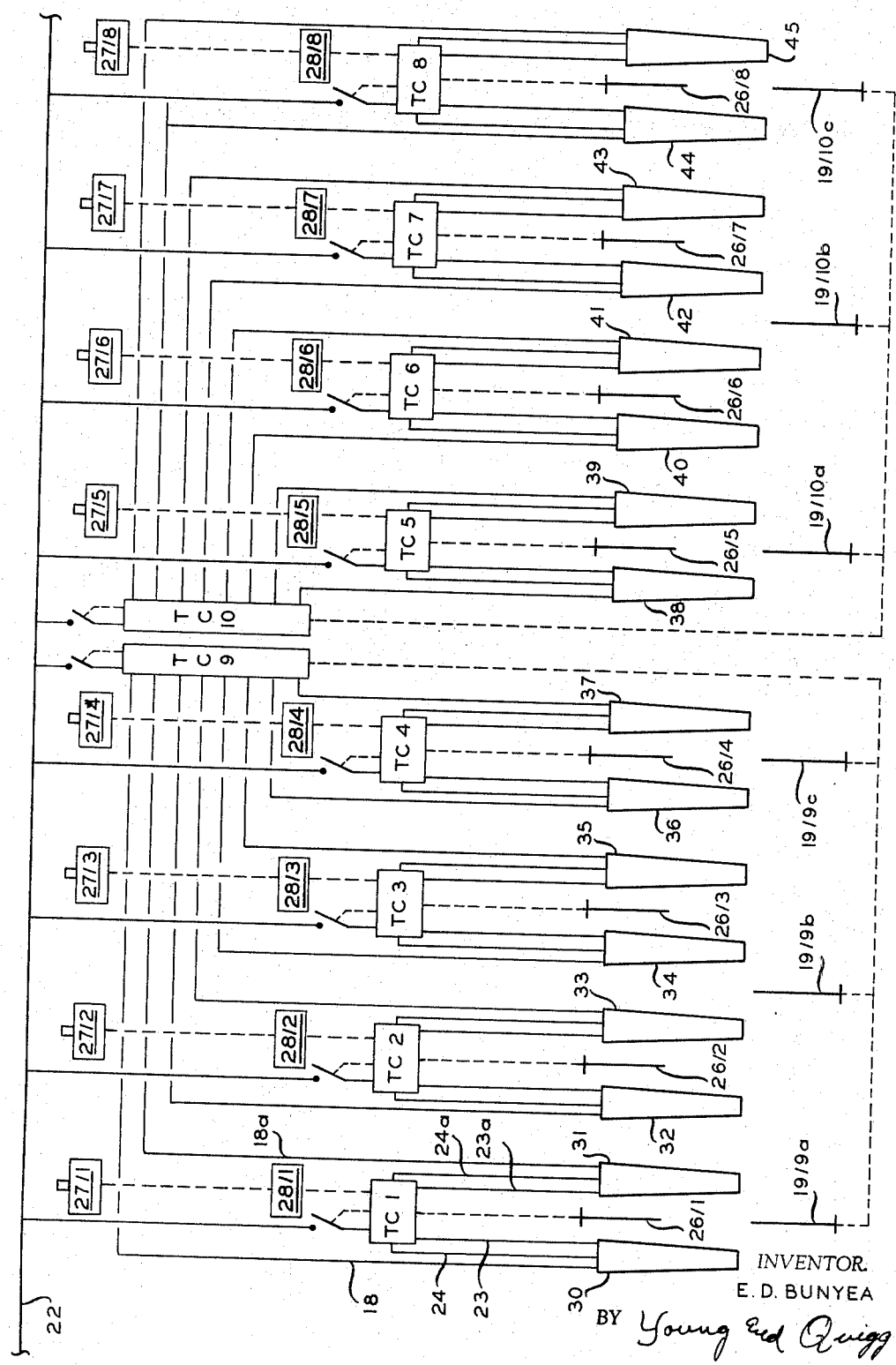
FIGURE 2 is a schematic flow diagram of the heater control system of the invention.

An electrical circuit adapted to control the temperature of the molten plastic material extruded from die 12 is illustrated in FIGURE 2. Since the heater cartridges 30, 31, 32, 33, 34, 35, 36, 37, 38, 39, 40, 41, 42, 43, 44 and 45 each contains three heater elements indicated as 18, 23 and 24 in cartridge 30, only heater cartridges 30 and 31 will be described with reference to the description of FIGURE 2. Similarly, the action of only temperature controller 1 will be described because the operation of temperature controllers 2, 3, 4, 5, 6, 7, and 8 will be substantially the same as that of temperature controller 1. Thickness gauge 27/1 will operate in the same manner as thickness gauges 27/2, 27/3, 27/4, 27/5, 27/6, 27/7 and 27/8. The operation of temperature controller 9 in co-operation with thermocouples 19/9a, 19/9b and 19/9c will be described and the operation will also apply to temperature controller 10 in connection with thermocouples 19/10a, 19/10b and 19/10c.

Thermocouple 26/1 senses the temperature of the area of the die 12 adjacent heater cartridges 30 and 31 and controls the electrical power input to heaters 23, 24, 23a and 24a in accordance with the selected set point of temperature controller 1. Thickness gauge 27/1 determines the thickness of the plastic coating on the paper web 17 of FIGURE 1 and transmits a signal representative of thickness to thickness controller 28 which resets the set point of temperature controller 1 to increase the heat input to heater cartridges 30 and 31 by means of heaters 23, 24, 23a and 24a if the plastic coating thickness is less than a predetermined value as represented by the set point value of controller 28. The thickness controller 28 similarly resets the temperature controller 1 to reduce the heat input of heaters 23, 24, 23a and 24a if the plastic coating on the web 17 is greater than that of the set point value of controller 28.

Thermocouples 19/9a, 19/9b and 19/9c sense the average temperature of the die 12 and temperature controller 9 supplies electrical energy to heaters 18 and 18a and the corresponding heaters of cartridges 32, 33, 34, 35, 36 and 37 to supply to die 12 an amount of heat substantially equal to that dissipated by inherent heat losses of the die structure. The set point of temperature controller 9 is determined by the quantity of heat required to maintain the die at a preselected temperature with the heaters 23 and 24 of cartridge 30 and corresponding heaters of cartridges 31, 32, 33, 34, 35, 36 and 37 disconnected and with no plastic flowing through the die 12.

FIGURE 3 is a side elevation, partly in section, of the die 12 of FIGURE 1. Molten plastic from extruder 11 passes into passageway 46 and thence into the manifold 47 and slot 48 which terminates in the die opening 49. The manifold 47, slot 48 and die opening 49 extend throughout the width of the die 12 as shown in FIGURE 3. End plates 51 and 52 are secured to the ends of the die and provide end closures for the manifold 47 and slot 48. Deckling bars 53 and 54 act as end closures for the die opening 49 and determine the width of the molten plastic sheet extruded from die 12. End plates 51 and 52 are provided with cooling fins 55 and 56 to prevent overheating of the molten plastic, particularly when the deckling bars are pushed in toward the center of the die to produce a web having a width appreciably less than that of the die. Positioned at the lower side of the die 12 is a die jaw 57 with a similar die jaw 58 on the opposite side and not shown in FIGURE 3. Die jaw 57 is maintained in position by bolts 59, is adjusted downwardly by bolts 62 and is adjusted upwardly by bolts 61. Bolts 59 are loosened before adjustments are made with either bolts 61 or 62. Die jaw 58 is positioned similar to die jaw 57. The die opening 49 is adjusted to approximately the proper width or area to produce the desired thickness of coating on the web and the final adjustment is made by controlling the temperature of the plastic melt to provide the proper viscosity of melt to extrude the desired thickness of plastic film.

FIGURE 4 is a section taken alone lines 4—4 of FIGURE 3. This view shows that the heater cartridges are tapered so that by removing the nuts 63 and 64 from bolts 65 and 66, the die half A can be removed, leaving the heater cartridges, as represented by cartridge 30, secured to the die half B. A positive seal between the matching die halves is effected by soft metal rods 67 and 68 positioned in matching grooves 69 and 70 and 71 and 72.

FIGURE 5 is an end view of die 12 with the end plate plate 51 removed. The relative positions of the heater cartridges, thermowells and bolting arrangements are indicated by dotted lines. The end plate 51 is secured to the end of die 12 by means of cap screws or stud bolts threaded into the bolt holes shown in die 12. The end plate seals the end of manifold 47 and slot 48.

The apparatus and method of the invention are applicable for use with any of the thermoplastic materials used to coat webs such as paper. The invention has particular utility in coating paper with a solid polyolefin such as solid linear polyethylene and solid linear polypropylene such as that made by the process of Patent 2,825,721, issued Mar. 4, 1958, to J. P. Hogan et a. Copolymers are also applicable.

Paper coated according to the invention will usually be of a thickness in the range of ½ mil (0.00050 inch) to 22 mils (0.0220 inch). The polymer coating thickness will usually be in the range of about ¼ mil to 4 mils. When coating paper with solid linear polyethylene, the die temperature will be in the range of about 575 to 625° F.

The die of the invention will coat paper with solid linear polyethylene of a uniform thickness that varies not more than about 1 percent whereas the dies of the prior art produce a coating that will vary about 4 percent from the desired thickness. Sheets of film of uniform thickness are also produced.

The thickness gages can be any of the commercially available gages such as pneumatic gages, Beta gages and the like. All of the control instruments such as temperature controllers are conventional and are commercially available.

That which is claimed is:

1. The method of coating a web with a thermoplastic material which comprises extruding molten thermoplastic through a die slot to form a molten thermoplastic sheet having a width at least equal to that of the web to be coated; withdrawing the extruded sheet at a substantially constant rate; contacting a web with said molten thermoplastic sheet; pressing the sheet and web together with a substantially constant amount of pressure; continuously adding heat to the die across its width in an amount substantially equivalent to the heat radiated from the die; continuously measuring the thickness of the coated web at a plurality of loci across the width of the web; and adding heat to those areas of the die corresponding to the loci of measurement of film thickness in amounts sufficient to maintain the thickness of the web substantially constant.

2. The method of claim 1 wherein a paper web is coated with a polymer of ethylene.

3. The method of producing a thermoplastic sheet of substantially uniform thickness throughout its width which comprises extruding molten thermoplastic through a die slot having a width substantially that of the thermoplastic sheet; withdrawing the extruded sheet at a substantially constant rate; continuously measuring the thickness of the extruded sheet at a plurality of loci across the width of the sheet; and adding heat to the thermoplastic admitted to those areas of the die slot corresponding to the loci of measurement of film thickness in amounts sufficient to maintain the thickness of the sheet substantially constant.

4. The method of producing a thermoplastic sheet of substantially uniform thickness throughout its width which comprises extruding molten thermoplastic through a die slot having a width substantially that of the thermoplastic sheet; withdrawing the extruded sheet at a substantially constant rate; constantly adding heat to the die across its width in an amount substantially equivalent to the heat loss from the die by radiation; continuously measuring the thickness of the extruded sheet at a plurality of loci across the width of the sheet; and adding heat to those areas of the die adjacent the thermoplastic admitted to the die slot corresponding to the loci of measurement of film thickness in amounts sufficient to maintain the thickness of the sheet substantially constant.

5. A die for extruding thermoplastic sheet comprising an elongated body having an inlet for molten thermoplastic; a manifold opening of substantially uniform cross-sectional area extending throughout the longitudinal dimension of said body and communicating with said inlet; an extrusion outlet comprising a slot extending throughout the longitudinal dimension of said body and communicating with said manifold; a plurality of tapered passageways extending laterally through said body and spaced apart throughout the longitudinal dimension of the body; a tapered heater cartridge containing a plurality of heating elements positioned in each tapered passageway; a pair of adjustable die jaws positioned adjacent and on each side of the extrusion outlet slot throughout the longitudinal dimension of said body; means to adjust said die jaws so as to regulate the spacing between the die jaws; means to add heat to said heating elements in an amount substantially equal to the heat lost from said die by radiation so as to maintain thermoplastic in the die body molten; means to withdraw molten thermoplastic sheet from said space between said die jaws at a substantially constant rate; thickness gage means positioned so as to determine continuously the thickness of the extruded sheet at a plurality of loci across the width of the sheet; temperature control means operatively connected to each thickness gage and to the heaters in the die body corresponding to the areas of the extruded sheet at the loci of the thickness gage means so as to add heat to the heaters in an amount sufficient to maintain the thickness of the sheet at each thickness gage means substantially constant.

6. The die of claim 5 wherein fins are attached to each end of the die body to radiate heat from the die body ends.

7. The die of claim 5 including means to attach the thermoplastic sheet to a web.

References Cited

UNITED STATES PATENTS

| | | | |
|---|---|---|---|
| 2,051,781 | 8/1936 | Brown | 18—2 XR |
| 3,122,784 | 3/1964 | Jolliffe | 18—2 |
| 3,179,778 | 4/1965 | Schroyer et al. | 18—12 XR |

ALEXANDER H. BRODMERKEL, *Primary Examiner.*

P. E. ANDERSON, *Assistant Examiner.*